United States Patent [19]

Mathieu

[11] 4,291,453

[45] Sep. 29, 1981

[54] APPARATUS FOR AND METHOD OF SEVERING A FLEXIBLE REINFORCED ELASTOMERIC CONDUIT SUPPORTED ON A PLURALITY OF ELONGATED END-TO-END RIGID MANDRELS

[75] Inventor: Julien C. Mathieu, Waynesville, N.C.

[73] Assignee: Dayco Corporation, Dayton, Ohio

[21] Appl. No.: 83,065

[22] Filed: Oct. 9, 1979

[51] Int. Cl.[3] ...................... B29C 17/14; B29D 23/05; B26D 3/16; B23P 17/00

[52] U.S. Cl. .......................................... 29/417; 83/54; 83/371; 156/144; 156/428; 264/141; 264/149; 264/150; 264/209.1; 264/210.1; 264/334; 425/308; 425/438

[58] Field of Search ................. 29/235, 282, 412, 417, 29/427; 83/54, 371; 264/141, 145, 148-150, 209, 210.1, 334; 156/143, 144, 173, 250, 353, 428, 510; 425/308, 438

[56] References Cited

U.S. PATENT DOCUMENTS

| | | | |
|---|---|---|---|
| 2,599,493 | 6/1952 | Slaughter | 264/150 X |
| 3,376,181 | 4/1968 | Larson et al. | 264/150 X |
| 3,474,162 | 10/1969 | Seckel | 264/150 X |
| 3,865,526 | 2/1975 | Drostholm et al. | 425/308 X |
| 3,929,957 | 12/1975 | Holden et al. | 264/150 |
| 3,946,483 | 3/1976 | Holden et al. | 29/427 |
| 3,966,104 | 6/1976 | Holden et al. | 225/96 |
| 3,988,409 | 10/1976 | Holden et al. | 264/159 |
| 4,017,232 | 4/1977 | Holden et al. | 425/112 |
| 4,242,296 | 12/1980 | Bricker | 264/149 |

*Primary Examiner*—Ervin M. Combs
*Attorney, Agent, or Firm*—Charles E. Bricker

[57] ABSTRACT

An apparatus for and method of severing a continuous flexible reinforced elastomeric conduit supported on a plurality of elongated rigid mandrels disposed in connected end-to-end relation is provided with the apparatus and method enabling cutting through the conduit at each end of each mandrel so that each mandrel has a length of conduit therearound which is approximately equal to the length of the mandrel.

20 Claims, 6 Drawing Figures

APPARATUS FOR AND METHOD OF SEVERING A FLEXIBLE REINFORCED ELASTOMERIC CONDUIT SUPPORTED ON A PLURALITY OF ELONGATED END-TO-END RIGID MANDRELS

BACKGROUND OF THE INVENTION

1. Field of the Invention

This invention relates to a flexible tubular conduit made primarily of elastomeric material and to an apparatus for and method of severing a continuous length of such a conduit in predetermined lengths whilr it is being continuously manufactured and supported on elongated mandrels connected in end-to-end relation.

2. Prior Art Statement

Flexible tubular conduits of the character mentioned are widely used on industrial, commmercial, and household vacuum cleaners. A typical vacuum cleaner conduit of this type has one or more reinforcing wires wound in a helical pattern along its length and an elastomeric sleeve, usually made of a synthetic plastic material, bonded against the reinforcing wire or wires. The reinforcing wire or wires may serve simply to prevent collapse of an associated elastomeric sleeve disposed therearound; however, a plurality of such wires may be used each serving the dual purpose of reinforcement and electrical conductor.

U.S. Pat. No. 4,017,232 teaches an apparatus for continuously producing or manufacturing high quality vacuum cleaner conduit on rigid non-collapsible elongated mandrels of substantial length disposed in end-to-end relation. However, in manufacturing vacuum cleaner conduit in such a continuous manner it is very difficult to remove the conduit from around the mandrels.

As a step in removing such a conduit from around a plurality of rigid non-collapsible mandrels of the character mentioned, an apparatus and method have been proposed in U.S. Pat. No. 3,966,104 and No. 3,988,409 respectively where the conduit is severed so that a length thereof is provided on an associated supporting mandrel and such conduit length is approximately equal to the length of its supporting mandrel. However, the teachings and techniques of these two patents require weakening of the conduit adjacent each end of an associated mandrel followed by literally pulling the conduit apart at each weakened location; and, although a satisfactory severing is provided, the amount of conduit that is damaged and scrapped may tend to become excessive, thereby resulting in an increased cost for the overall conduit produced in this manner. It has also been disclosed in these two Patents, where the flexible conduit has one or more helical reinforcing wires extending therealong, to provide means for cutting each wire employing a cutter to cut the wire using the mandrel as a backup anvil followed by weakening and pulling apart of the conduit adjacent the cut reinforcing wire.

SUMMARY

It is a feature of this invention to provide an apparatus for severing or cutting flexible reinforced elastomeric conduit which is supported on a plurality of elongated rigid non-collapsible mandrels connected in end-to-end relation during continuous production of such conduit so that each mandrel has a length of conduit therearound which is approximately equal to the length of the mandrel and wherein the severing is achieved with minimum damage to and hence loss of such elastomeric conduit and with no damage to the mandrels.

Another feature of this invention is to provide an apparatus of the character mentioned which utilizes a carriage having means supporting the connected end-to-end mandrels and the conduit disposed therearound during movement thereof and the carriage carries a cutter which is operated to provide an efficient cutting action in a simple cutting operation substantially "on the fly," i.e. without stopping the continuous production of the conduit.

Another feature of this invention is to provide an apparatus of the character mentioned which utilizes detection means for detecting mandrel connectors at the ends of the mandrels and controlling the cutter and devices used to enable provision of the cutting action.

Another feature of this invention is to provide an apparatus of the character mentioned which may be readily installed in an existing production system yet which provides an efficient cutting or severing operation.

Another feature of this invention is to provide an improved method of cutting or severing a conduit of the character mentioned while supporting such conduit on elongated mandrels disposed in aligned end-to-end relation yet without damage to such mandrels and with minimum damage to such conduit.

Therefore, it is an object of this invention to provide an improved apparatus for and method of severing conduit of the character mentioned having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DETAILED DESCRIPTION

Figure 1:
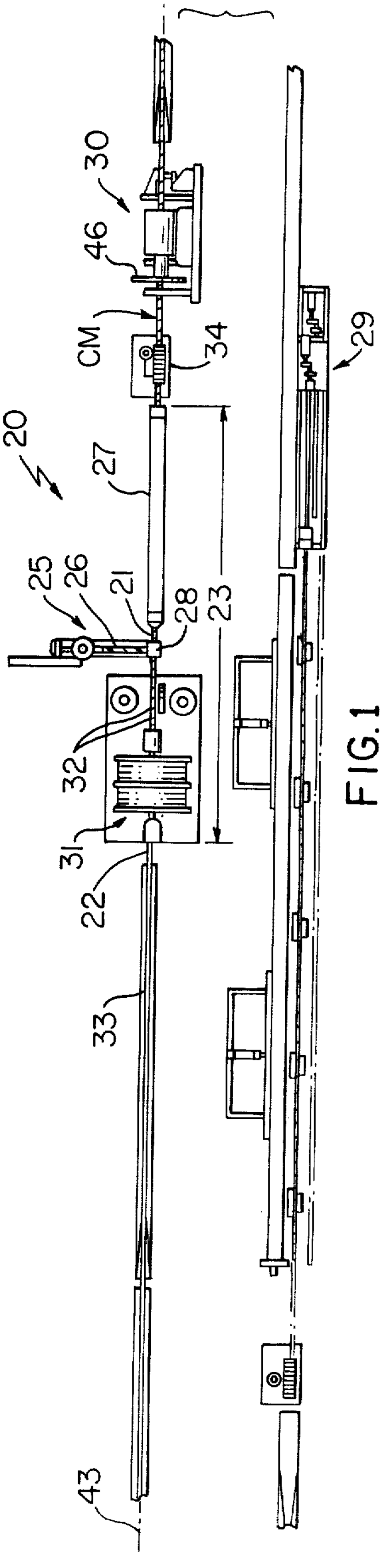
FIG. 1 is a plan view with parts broken away, parts in cross-section, and other parts shown schematically of an exemplary machine system or apparatus which may be employed to produce a continuous reinforced elastomeric conduit and wherein such system utilizes one exemplary embodiment of the apparatus and method of this invention for severing such conduit.

Reference is now made to FIG. 1 of the drawings which illustrates the basic parts of an exemplary apparatus or machine system which is designated generally by the reference numeral 20 and the machine system or machine 20 may be of the type disclosed in the above-mentioned U.S. Pat. No. 4,017,232 and the disclosure of this patent is incorporated therein by reference thereto.

Figure 4:
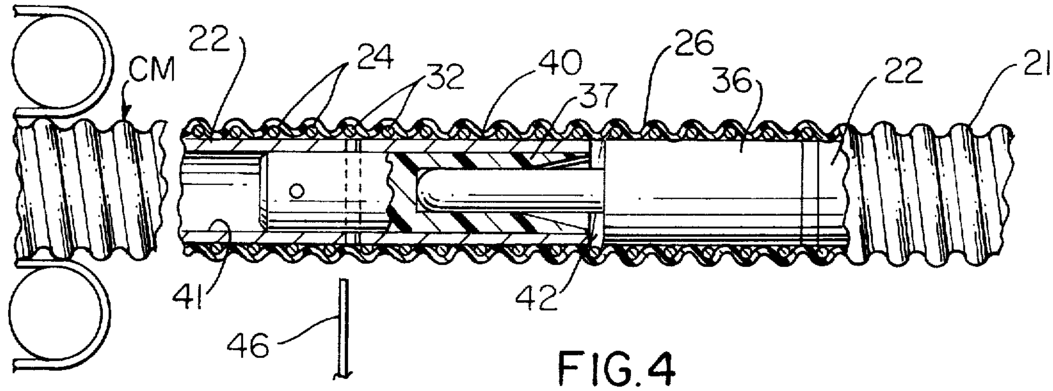
FIGS. 4, 5, and 6 are enlarged sequential views with parts in elevation, parts in cross-section, and parts broken away of conduit being cut and particularly illustrating the sequence utilized in the cutting or severing of such conduit utilizing the apparatus and method of this invention.

As disclosed in this patent, the machine 20 is used to produce a flexible reinforced elastomeric conduit 21 in a continuous manner and employs a plurality of elongated substantially rigid non-collapsible mandrels 22, also see FIG. 4, which are operatively associated in aligned end-to-end relation.

The exemplary mandrels 22 are operatively associated by interconnection thereof at their ends, as will be described subsequently, and are moved continuously through a fabrication area 23 where at least one elongated plastic sleeve covered reinforcing member or wire, and in this example a plurality of two reinforcing wires 24, FIG. 4, are formed around the mandrels in a pair of continuous non-rotating helical coils 32. An extruder head 28, which is provided as a part of an extrusion apparatus 25, is located in the fabrication area 23 and extrudes an elastomeric material in the form of a synthetic plastic material 26, which defines a synthetic plastic seamless tube around the coils 32 and for ease of understanding such tube is also designated by the reference numeral 26. The tube 26 is urged and bonded against the wires 24 to define a conduit covered mandrel, designated CM. The extrusion apparatus 25 has suitable urging means associated with the extruder head 28 for urging the hot plastic tube 26 against the coils 32; and, such urging means comprises vacuum means associated with extruder head 28 and may be of the type disclosed in U.S. Pat. No. 3,725,178, and the disclosure of this patent is also incorporated herein by reference.

The apparatus or machine 20 has cooling means such as a cooling apparatus or chamber 27 which cools the hot plastic tube 26 which has been heat fused at its points of contact with the plastic sleeve of the wires 24.

Figure 2:
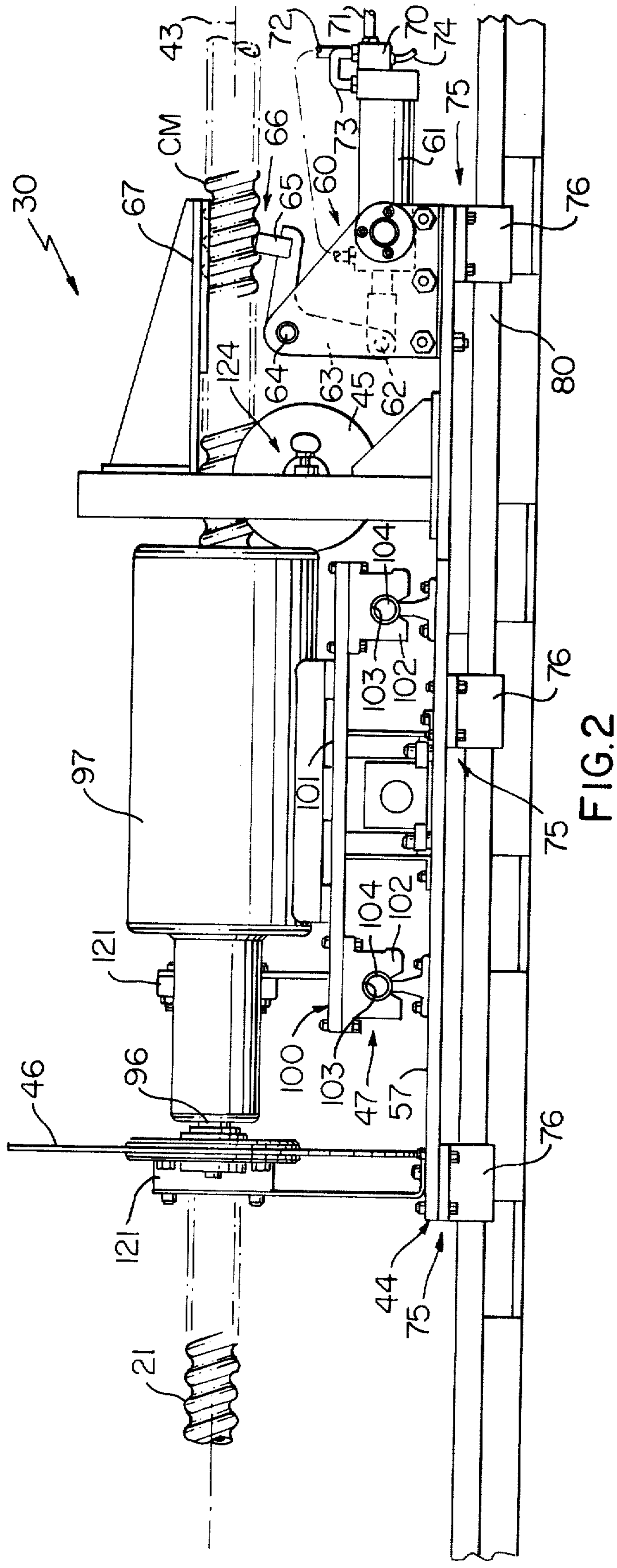
FIG. 2 is a view in elevation with parts broken away particularly illustrating the apparatus and method for severing conduit of this invention and also illustrating a conduit to be severed as it moves on such apparatus.

The conduit 21 is separated from around the operatively associated mandrels 22 and such separation is commenced by first severing the conduit 21 utilizing the apparatus and method of this invention, which is designated generally by the reference numeral 20 (FIGS. 1-3), so that each mandrel 22 has a length of conduit 21 therearound which is approximately equal to the length of its supporting mandrel. The conduit length 21 may be removed from around its associated mandrel 22 utilizing a removing apparatus 29 (FIG. 1) of the type disclosed in U.S. Pat. No. 3,946,483.

The exemplary conduit 21 is particularly adapted for use as a vacuum cleaner conduit or hose and comprises the two helically wound reinforcing wires 24 each of which is also capable of serving as an electrical conductor and for reasons which are known in the vacuum cleaner industry. Each wire 24 has a central electrically conductive core made of a metallic material and an outer wire sleeve made of a plastic material in the form of an electrical insulating material. Each wire sleeve is made of a material which is compatible with the plastic tube 26 so that once such tube is urged and formed against the sleeves of the wires 24 a unitary conduit 21 is defined.

The machine 20 has suitable wire forming means (FIG. 1) in the form of a wire forming or coiling machine 31 which forms a pair of wires 24 into a pair of continuous non-rotating helical coils 32 extending the full length of the conduit 21 and thus each length thereof. The coils 32 are formed by the machine 31 against each mandrel 22 enabling forming thereof with precision.

The machine system 20 has conveying means through the fabrication area 23 comprising a conveyor 33 and a puller 34 and such conveyor and puller are particularly adapted to move each mandrel 22 with helical coils 32 therearound through the extruder head 28 at a speed correlated with the speed of forming the helical coils 32. The helically wound coils 32 with the plastic tube 26 extruded thereagainst are bonded together by fusion between the hot semi-molten inside surface of the tube 26 as it engages the outside surface of the plastic sleeve of the reinforcing wires 24.

As previously mentioned the machine 20 has suitable cooling means in the form of the cooling apparatus or chamber 27 which cools the hot plastic tube 26 extruded against coils 32. The cooling apparatus 27 may be of any suitable type commonly used in the art and preferably is in the form of either a trough filled with circulating cold tap water or a chamber having spray nozzles therein each of which directs a spray of water against the hot plastic tube as it exits the extruder head 28 of apparatus 25.

Figure 5:
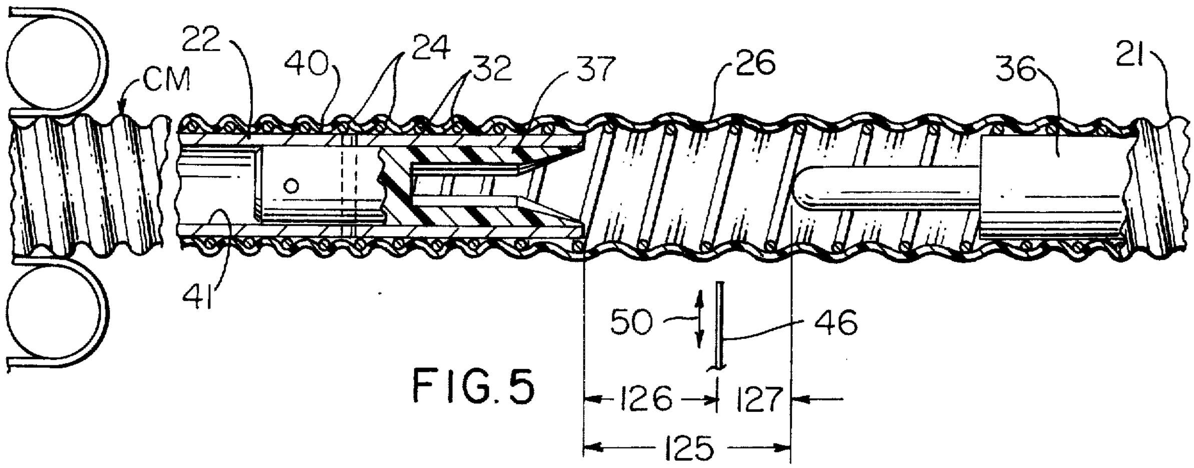
Figure 6:
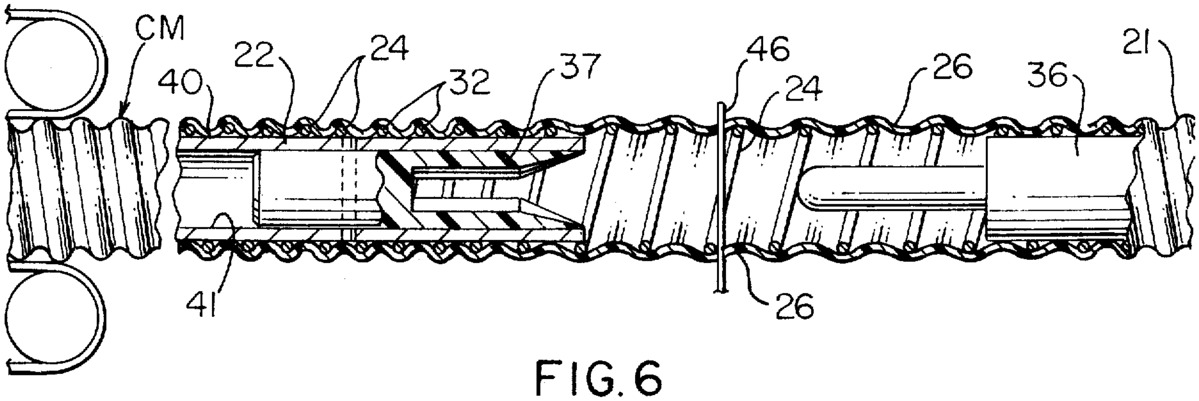

The mandrels 22 have means for connecting associated ends thereof in aligned relation and such connecting means is shown in FIGS. 4-6 and comprises a male connector 36 and a female connector 37 at opposite ends of each mandrel 22 with the male connector 36 of one mandrel 22 being adapted to be connected to the female connector 37 of an adjoining mandrel 22. The associated male and female connectors 36 and 37 are brought together during operation of the machine 20 and fit together with a loose fit therebetween; however, the associated male and female connectors are held together by the precise control of the movement of each set of forward and rear mandrels during the forming of coils 32 therearound and the extrusion of tube 26 over the coils and mandrel.

Each of the mandrels 22 is a substantially rigid non-collapsible mandrel and is made of a comparatively hard non-yielding material such as metal, hard plastic, or the like. Each mandrel 22 is preferably in the form of a tubular mandrel which has a substantially rigid right circular cylindrical outside surface 40 and a similar right circular cylindrical inside surface 41. The connectors 36 and 37 connect associated mandrels 22 so that their cylindrical outside surfaces 40 are arranged in aligned relation and, in essence, define one substantially continuous cylindrical surface as the mandrels pass through the fabrication area 23 with the exception that a small annular gap 42 (FIG. 4) may be provided between a connected male connector 36 and female connector 37 to prevent damage to adjoining cylindrical surfaces. Because of their loose fit each pair of connected connectors 36 and 37 are easily pulled apart once the conduit 21 of the conduit covered mandrel CM is severed and the severing apparatus and method will now be described in detail.

The severing apparatus and method 30 of this invention enable severing of the conduit 21 with a clean cutting action and minimum damage to such conduit whereby there is minimum conduit scrappage and minimum economical loss, usually attendant to such scrappage. In addition, because the mandrel connectors are not used as anvils, but are pulled apart during the cutting action, there is no damage to such connectors.

As the conduit 21 is manufactured in a continuous production process it is supported by associated ones of the plurality of mandrels 22 and the mandrels are moved into and through the fabrication area 23 while connected in aligned end-to-end relation. The conduit 21 and mandrels 22 are moved in a rectilinear path which is preferably a horizontal path and is indicated by dot-dash lines 43 in FIGS. 1, 2, and 3. The severing apparatus 30 is disposed along this path 43 and comprises a carriage 44 which is supported for movement along such path in a manner to be described subsequently. The carriage has means supporting the connected mandrels and the continuous conduit 21 disposed therearound during movement on the carriage and such supporting means comprises a rotatable support wheel 45.

The apparatus 30 comprises a cutter 46 which is carried on the carriage 44 for movement therewith along the rectilinear path 43; and, a cutter support structure designated generally by the reference numeral 47 (FIG. 2) is provided and supports the cutter 46 on the carriage 44 for movement in a cutting path which is transverse the rectilinear path 43 and is preferably perpendicular to such path 43. For ease of description and later presentation the cutting path is designated generally by the reference numeral 50 and is indicated by a double arrow in FIGS. 2 and 5.

The severing apparatus 30 has detecting means mounted on the carriage 44 for movement therewith and in this example such detecting means consists of a pair of spaced apart electrical detectors or sensors preferably in the form of electro-magnetic detectors and such detectors are designated by the reference numerals 51 and 52. The detectors 51 and 52 are provided for detecting the connecting means of the mandrel 22 and in particular for detecting the male connectors 36 and female connectors 37 thereof. The detectors 51 and 52 are operatively connected by electrical leads 53 and 54 respectively to a central control system 55, shown schematically in FIG. 3 as being carried by a horizontal platform portion 56 of a main support frame 57 of the carriage 44. The operation of the detectors 51 and 52 and the control system 55 will be described in detail subsequently.

The apparatus 30 has pulling means 60 for pulling the connecting means and in particular for pulling the connectors 36 and 37 of an adjoining pair of mandrels 22 apart when such mandrel connectors are over the carriage 44 and in the vicinity of the cutting path 50 to provide a controlled axial distance between the connectors 36 and 37 of an adjoining pair of mandrels 22. The pulling means 60 comprises an actuator in the form of air cylinder 61 (FIG. 2) which has a telescoping rod end pivotally connected by a pin 62 to an arm of an L-shaped link 63 which is also pivotally mounted at the bight thereof by a pin 64 and an opposite freely movable arm of the L-shaped link 63 has a friction block 65 suitably fixed thereto which is particularly adapted to engage the conduit covered mandrel CM as shown at 66. The friction block 65 urges the conduit covered mandrel CM against a horizontally disposed backup member 67 for a purpose to be subsequently described.

The air cylinder 61 is controlled by an electrically operated air solenoid valve 70 which is provided with air under pressure through a conduit 71 from a suitable pressure regulated source. The valve has a pair of pressure conduits 72 and 73 operatively connected thereto and to opposite ends of the air cylinder 61 for controlling the extension and retraction of the telescoping rod end of such air cylinder 61, to thereby control the movement of the friction block 65 toward and away from the conduit covered mandrel CM. The valve 70 has an electrical control cable 74 extending therefrom which connects the valve 70 to control system 55.

As previously mentioned the carriage 44 is supported for movement along the rectilinear path 43 and such carriage is supported on the main support frame 57. The support frame 57 has pairs of depending support structures each designated generally by the same reference numeral 75 on opposite sides thereof and the support structures 75 are disposed in equally spaced relation on opposite sides of the rectilinear path 43. The support structures 75 also serve as guide structures and each structure 75 comprises a pair of vertically disposed guide plates 76 which confine the movement of the carriage 44 so that movement can only be achieved in opposed directions along the rectilinear path 43. The plates 76 are disposed on opposite sides of an associated horizontal way 80. The ways 80 are provided with suitable antifriction surfaces and support carriage 44 for horizontal movement along the rectilinear path 43.

Figure 3:
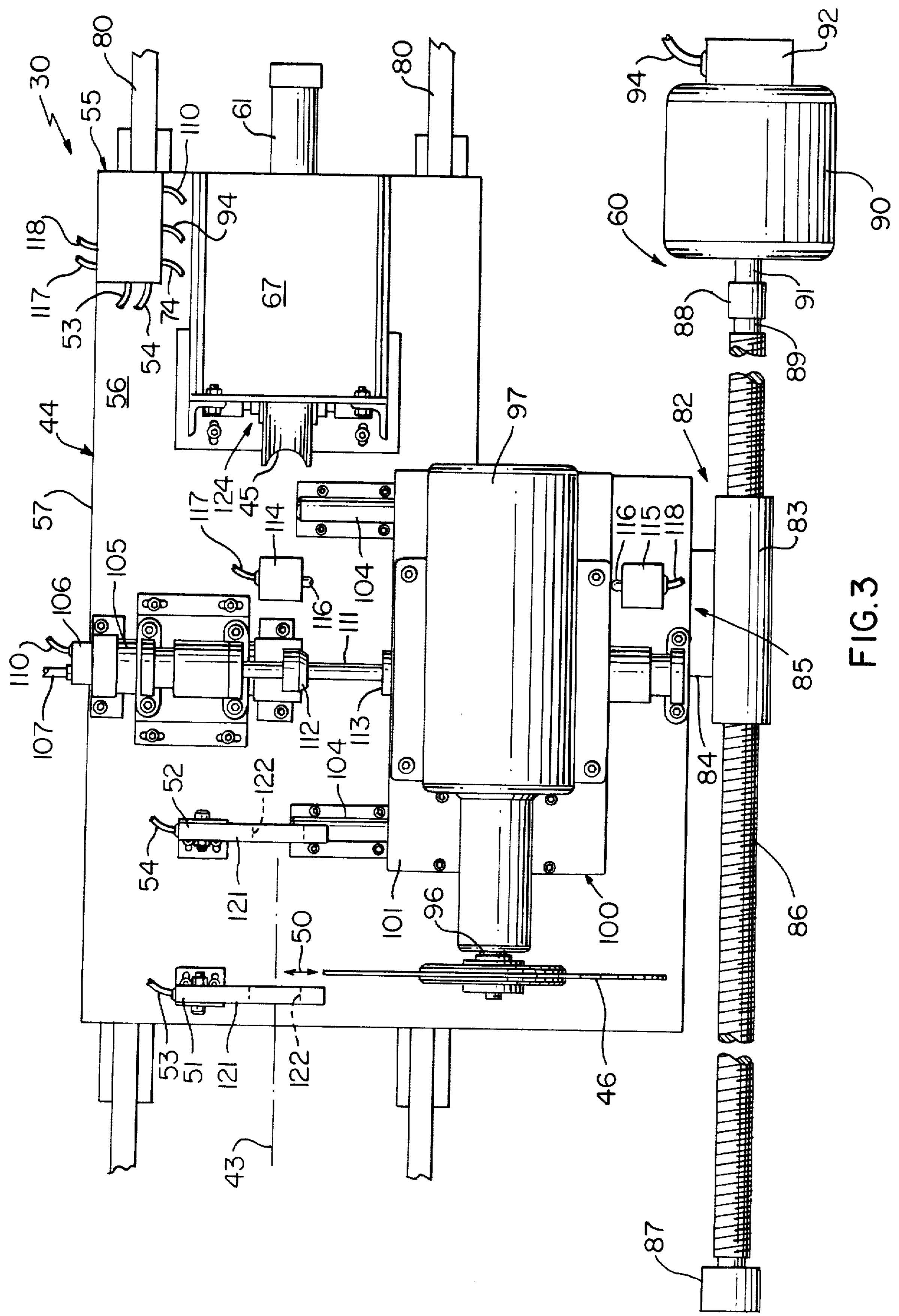
FIG. 3 is a plan view with parts broken away of the apparatus of FIG. 2 and also schematically illustrating a carriage moving mechanism which is not shown in FIG. 2.

The pulling means 60 of the severing apparatus 30 also has a carriage traversing mechanism which, for convenience, is only illustrated in FIG. 3 and is designated generally by the reference numeral 82. The traversing mechanism 82 may be any suitable form of mechanism including a so-called ball screw and motor system, an air cylinder system, or the like. However, in this example of the invention a screw and motor system is provided and comprises an antifrication nut assembly or nut 83 which is fixed by a member 84 to the carriage 44 as shown at 85. The nut may have recirculating ball bearings, which provide antifriction properties therefor, and has a cooperating high lead screw 86 threaded therethrough. The screw 86 is supported for rotation in opposed directions by an antifriction bearing assembly 87 at one end and has a similar supporting antifriction bearing assembly 88 at its opposite end which receives a plain shaft end 89 of the screw therethrough. The screw 86 is driven by a reversible electric motor 90 which has a shaft 91 extending therefrom which is suitably fixed to the shaft end 89 of the high lead screw 86. The motor is supplied with electric power from a suitable electric source through a motor control unit 92 and the control unit is operatively connected to the overall control system 55 by an electrical cable assembly 94.

As previously mentioned, the cutter 46 has a support structure 47 which supports the cutter on the carriage 44 for reciprocating movements along the cutting path 50 (FIG. 2); and, the cutter 46 is preferably an abrasive wheel cutter 46 which is suitable detachably fixed to a shaft 96 extending from an electric motor 97, which is the cutter drive. During operation of the severing apparatus 30 the electric motor 97 rotates its shaft 96 and the abrasive wheel cutter 46 attached thereto at high speeds; and, for optimum cutting efficiency such rotation is continued even during those times when a cutting action is not in progress.

The cutter support structure 47 comprises a table assembly 100 comprising a horizontal platform 101 which has the electric motor 97 and hence the cutter 46 attached thereon; and, the platform 101 has a pair of depending structures 102 disposed therebeneath in horizontally spaced relation. The structures 102 have arcuate bearing surfaces 103 which are supported on the upper portions of right circular cylindrical ways 104. The ways 104 are attached to and thus carried on the platform portion 56 of the carriage 44. Thus, the cutter 46 is supported by the support structure 47 for movement along the cutting path 50 perpendicular to the rectilinear path 43 and this movement is achieved by moving the platform 101 and the entire electric motor 97 which has the abrasive wheel cutter 46 attached to its output shaft 96.

The severing apparatus 30 also has means for moving the cutter 46 along the cutting path 50 and such means in this example of the invention comprises an actuator which is shown in FIG. 3 as an air cylinder 105. The air cylinder 105 is controlled by an electric solenoid valve 106 at one end thereof and the valve 106 is provided with air under regulated pressure from a suitable source through an air conduit 107. The valve 106 is electrically controlled by electrical cable assembly 110 operatively connected to the control system 55; and, the air cylinder 105 has an extensible and retractable rod 111 which is moved by the cylinder 105. The rod is suitably attached at its output end to the table assembly 100 and thus moves the table assembly, electric motor 97, and cutter 46 once the air cylinder 105 is actuated.

The air cylinder 105 is a quick-acting cylinder which moves its rod 111 in each of its opposed directions at high speeds; and, with the motor 97 operating to rotate the wheel cutter 46 at a high rotational speed the conduit 21 with its reinforcing wires are thereby cut substantially instantaneously. The cutting action produced by the cutter 46 assures that the conduit portions on opposite sides of each cut are usable.

The table assembly 100 has stop means associated therewith for stopping or limiting the advancing or cutting movement of such table assembly and the stop means comprises a resilient stop cushion 112 supported at a fixed position on the platform 56 and a cooperating member 113 which is fixed to the table assembly 100 and is adapted to strike the cushion 112. Once the air cylinder 105 moves the cutter 46 along the cutting path 50 to provide the cutting action, the members 112 and 113 cooperate to prevent overtravel of the cutter 46 once the circumferential edge of the cutter 46 extends beyond the maximum diameter of the conduit 21 which is to be cut during its movement along the rectilinear path 43. The table assembly 100 may also be provided with stop means for limiting the retracting movement of the table assembly 100 and cutter 46, if desired.

The severing apparatus 30 has a pair of electrical limit switches 114 and 115 supported at fixed positions on opposite sides of the table assembly 100. Each switch has an outwardly spring urged telescoping plunger which is designated by the reference numeral 116. Once depressed, each plunger 116 serves to energize its switch and as each plunger 116 is released it de-energizes its switch and self returns to its extended position. The switches 114 and 115 have electrical cables 117 and 118 respectively which operatively connect such switches to the control system 55.

As previously mentioned the severing apparatus 30 has a pair of sensors or detectors 51 and 52 and such detectors are preferably of a magnetic induction type and provide a very sensitive detection of the ends of the mandrels 22 and in particular the connectors 36 and 37 on the ends of such mandrels. This detection of connectors 36 and 37 is achieved because the main portion of each mandrel 22 in this example of the invention is made of a ferromagnetic material such as high-strength tubular steel while the connectors 36 and 37 are preferably made of synthetic plastic material having high strength.

The operation of each detector 51 and 52 is such that a particular signal is provided to the detector as long as the ferromagnetic portion of the mandrel 22 is moving in operative association therewith which causes the detector to provide one output through its electrical lead to the control system 55. However, once a plastic connector, either 36 or 37, is in operative association with each detector a substantially different signal is provided which causes the detector to provide another correspondingly different output to the control system.

The detectors 51-52 are constructed and arranged to assure maximum efficiency. Thus, each has a vertically disposed plate-like or plate portion 121 and each plate portion 121 has a right circular cylindrical opening 122 extending therethrough which has a diameter which is larger than the diameter of a conduit covered mandrel CM to be received therethrough while travelling at high speed yet the diameter of each opening 122 is sufficiently small to assure provision of a high quality signal to its associated detector. The openings 122 are disposed in aligned relation with their axes coinciding with the rectilinear path 43 whereby each conduit covered mandrel CM may be moved at high speed over the carriage 44 through the aligned openings 122, and over rotatable support wheel 45 on the carriage. The wheel 45 rotates in a plane coinciding with path 43 and is suitably rotatably supported by an antifriction bearing assembly 124 which is in turn supported on main support frame 57 of the carriage 44.

Having described the main operating components of the severing apparatus 30, the detailed description will now proceed with description of the manner in which such apparatus is employed to cut through vacuum cleaner type conduit 21 during continuous production of such conduit on the mandrels 22 which are connected in aligned end-to-end relation. The severing apparatus 30 serves to cut through the conduit 21 at each end of each mandrel 22 so that each mandrel has a length of conduit 21 therearound which is approximately equal to the length of the mandrel.

As the conduit 21 is continuously produced by the machine 20 it is moved in a continuous manner by conveying means, including puller 34, of such machine along the rectilinear path 43. Accordingly, the conduit covered mandrels CM are moved over the carriage 44 and through the openings 122 of the detectors 51-52; and, as the plastic connector 36 of the leading mandrel moves through the first detector 51 an appropriate output is provided through its electrical lead 53 to the control system 55. The control system 55 employs cooperating electrical components, of any suitable type known in the art, and system 55 provides the overall functions now to be described whereby a detailed description of the electrical, electronic, and electromechanical components of the system will not be presented.

The signal from detector 51 to the control system 55 produces no action externally of such system whereby the conduit covered mandrels continue along the path 43. However, as the plastic connector 36 passes through the opening 122 of the detector 52 another output signal is provided through its electrical lead 54 to the control system 55.

The signal from detector 52 energizes appropriate circuits of the control system 55 causing an appropriate signal to be provided through electrical cable 74 to solenoid valve 70 of the air cylinder 61, which comprises the pulling means 60. The valve 70 is actuated so that it provides pressurized air from supply conduit 71 through conduit 72 and causes retraction of the telescoping rod end of the air cylinder 61 which in turn causes the friction block 65 to urge the conduit covered mandrel CM against the backup member 67, as shown at 66. The effect of this clamping action is to clamp the conduit covered mandrel CM to the carriage 44.

Simultaneously with the clamping of the conduit covered mandrel CM to the backup member 67 another signal is provided by the control system 55 to the carriage pulling or traversing mechanism 82 of the pulling means 60 which operates to pull the carriage 44 at high speed along the rectilinear path 43. The signal from system 55 to the mechanism 82 is provided through electricalcable 94 to the reversible electric motor 90 which causes instantaneous energizing of the motor 90 and high speed advancing rotation of the high lead screw 86. The screw acts through the antifriction nut assembly 83 to provide movement of the carriage 44 along the rectilinear path 43.

During this pulling action provided by the traversing mechanism 82 the carriage 44 is moved by motor 90 and screw 86 at a substantially greater speed than the speed at which the moving means comprising puller 34 is normally moving the conduit covered mandrel CM along the rectilinear path 43. Because a forward mandrel 22 (associated with male connector 36) and its conduit portion are clamped to the carriage 44 and a rear mandrel 22 (associated with a cooperating female connector 37) are, in essence, held back by the puller 34 there is the provision of a controlled axial distance 125 (FIG. 5) between an adjoining associated pair of mandrels 22 and in particular between the leading male connector 36 and trailing female connector 37 of such mandrels. This axial distance is surrounded by a corresponding length of, now stretched, conduit 21 and the relative movements of components is such that the conduit 21 has portions of such axial length indicated as portions 126 and 127 on opposite sides of the cutting path 50 of the cutter 46.

The design, construction, and operation of the severing apparatus 30 with its control system 55 are such that portions 126 and 127 are provided simultaneously with the exit of the female connector 37 from the detector 51. This exit is produced by the detector 51 overtaking the female connector 37 and moving beyond it in the same direction of movement as the carriage 44. Once portions 126 and 127 are produced and the female connector 37 exits the detector 51 a signal is provided by detector 51 to the control system 55 through its lead 53 and system 55 provides another signal through cable 110 to the valve 106 of air cylinder 105.

The signal to valve 106 causes substantially instantaneous movement of table assembly 100 and cutter 46 along the cutting path 50 to provide a cut through the stretched conduit 21 including the reinforcing wires thereof, as shown in FIG. 6. As the cutting action is complete the bumper member 113 strikes the shock absorber member 112 and simultaneously depresses the plunger portion 116 of the limit switch 114 which provides a signal through lead 117 to the control system 55. The signal through lead 117 causes the system 55 to provide the appropriate signal to the air cylinder 61 of the pulling means thereby releasing the friction block or clamp 65 and thereby releasing the, now cut away, forward mandrel 22 and its conduit. Simultaneously with this action, the control system 55 also provides a signal to the air cylinder 105 and to the motor 90 which drives the carriage 44.

The signal to the motor 90, through its unit 92, causes reverse rotation of the motor 90 resulting in the carriage 44 being returned to its starting position. The signal to air cylinder 105, through its valve 106, causes such cylinder to return the table assembly 100 and cutter 46 to its original starting position. As the cutter 46 is returned to its original starting position, the limit switch 115 is actuated and provides a signal through its lead 118 to the control system 55 which resets all circuits in the control system 55 so that the severing operation may be repeated.

In this disclosure of the invention the puller 34 comprises the conveying or moving means for the conduit 21 and its supporting mandrels 22 during continuous production. The puller 34 also serves as a restraining device and cooperates with the pulling means 60 to help pull apart an adjoining pair of mandrels 22 as will now be described. In particular, as the carriage 44 is moved at comparatively high speed with a forward mandrel 22 clamped thereto to stretch a length 125 of conduit between associated previously connected connectors 36 and 37, the puller 34 still maintains its frictional grasp of the rear conduit covered mandrel CM; however, the puller 34 normally provides movement of the conduit covered mandrels CM at a speed which is about 50% to 100% less than the speed at which the carriage 44 is moved whereby the pulling apart of adjoining mandrels at their connectors is effectively achieved.

The puller 34 may be of any suitable known construction and this example of the invention such puller has a pair of cooperating belt-like structures which are urged against and engage opposed surfaces of each conduit covered mandrel CM as each moves therebetween. The belt-like structures rotate in opposite directions and cooperate, once frictionally urged against the conduit covered mandrel CM, to pull or restrain the conduit covered mandrel CM in the manner previously described. A typical puller of this type is manufactured by the Gatto Machinery Development Corporation, 134 Rome St., Farmingdale, N.Y. 11735 and sold under the designation of Model No. 207 CAT-A-PULLER. It will also be appreciated that the puller 34 may be modified with suitable devices, as is known in the art, to control its contact forces against a conduit covered mandrel CM and thereby control its restraining capability.

From the foregoing description it is apparent that the severing apparatus and method of this invention provide cutting of mandrel reinforced conduit (which may consist of wire reinforced conduit) essentially "on the fly," i.e., without stopping the conduit manufacturing operation. In addition, a single cutter 46 may be used to cut not only through the elastomeric sleeve material 26 but also through reinforcing wires to thereby provide a cutting action of optimum efficiency. The unique manner in which the cutting action is provided results in the conduit 21 having comparatively sharply defined ends which are free of mangled portions which require scrapping. Thus, the severing apparatus and method 30 enable efficient cutting through conduit 21 at each end of each mandrel 22 so that each mandrel has a length of conduit therearound that is approximately equal to the length of the mandrel. Each mandrel 22 may then have the conduit 21 stripped therefrom as previously mentioned.

In this disclosure of the invention a reinforced flexible tubular conduit 21 has been shown and described as being made primarily of synthetic plastic materials. However, it will be appreciated that the conduit 21 and in particular the tube portion 26 thereof may be made of any suitable elastomeric material in the form of either a plastic material, or rubber whether in the form of natural rubber or a synthetic rubber compound.

It will also be appreciated that the flexible conduit 21 may have only one or a plurality of more than two reinforcing wires or members 24 which are helically wound and provided with or without a sleeve therearound. Further, the flexible conduit 21 may be reinforced by any other suitable means well known in the art.

Each mandrel 22 is shown and described herein as being a tubular mandrel; however, it will be appreciated that such a mandrel need not necessarily be tubular but may be of a substantially solid cross-sectional configuration provided such a solid mandrel is also rigid and has a comparatively rigid outside surface.

The mandrels 22 used in the apparatus and method of this invention may range in length between several feet and 100 feet. Mandrels ranging between 30 and 50 feet have been used successfully in vacuum cleaner applications.

The type of conduit which may be processed using the apparatus and method of this invention may be not only vacuum cleaner type conduit as shown and described but any type of substantially flexible conduit used to convey all types of fluid.

Reference has been made in this disclosure to the front, forward, or leading mandrel; and to the rear, or trailing mandrel, etc. However, it is to be understood that these words have been used to describe the movement of mandrels 22 as they move through the overall manufacturing machine and the severing apparatus 30.

In this disclosure of the invention terms such as electrical cable assembly, cable, lead, and the like, have been used. Basically these words may be used interchangeably to describe an appropriate electrical connection between an associated component and the electrical system 55.

While present exemplary embodiments of this invention, and methods of practicing the same, have been illustrated and described, it will be recognized that this invention may be otherwise variously embodied and practiced within the scope of the following claims.

What is claimed is:

1. In a machine system for producing a continuous flexible reinforced elastomeric conduit comprising; a plurality of elongated rigid mandrels having connecting means at opposite ends thereof for connecting said mandrels in aligned end-to-end relation; said conduit being supported by associated ones of said mandrels in connected relation during continuous production and movement of said conduit in a rectilinear path; and an apparatus for severing said conduit adjacent each connecting means of each mandrel; the improvement wherein said severing apparatus comprises; a carriage supported for movement along said rectilinear path, said carriage having means supporting the connected mandrels and conduit disposed therearound during said movement on said carriage, a cutter carried on said carriage for movement therewith along said rectilinear path, a support structure supporting said cutter on said carriage for movement in a cutting path transverse said rectilinear path, means on said carriage for detecting said connecting means, pulling means operatively connected to and controlled by said detecting means for pulling the connecting means of an adjoining pair of mandrels apart over said carriage to provide a controlled axial distance between connecting means of said adjoining pair of mandrels, said axial distance being surrounded by a corresponding length of said conduit and having portions of said axial length on opposite sides of said cutting path, and an actuator for moving said cutter along its support structure and cutting path for cutting through said corresponding length of conduit, said severing apparatus serving to cut through the conduit at each end of each mandrel so that each mandrel has a length of conduit therearound which is approximately equal to the length of the mandrel.

2. A machine system as set forth in claim 1 and further comprising a pair of horizontal ways supporting said carriage for movement along said rectilinear path.

3. A machine system as set forth in claim 1 in which said cutter comprises a rotary abrasive disc cutter.

4. A machine system as set forth in claim 3 and further comprising an electric motor for driving said abrasive disc cutter at high speed and thereby provide an efficient cutting action.

5. A machine system as set forth in claim 1 in which said means on said carriage for detecting said connecting means comprises a pair of cooperating spaced apart magnetic detectors and further comprising a severing apparatus control system having said detectors operatively connected thereto, and electrical connection means operatively connecting said control system to said pulling means and said actuator for said cutter.

6. A machine system as set forth in claim 1 in which each of said mandrels is made of magnetic material and said connecting means comprises a male connector on one of said mandrels and a female connector on an adjoining mandrel, said connectors being made of a nonmagnetic synthetic plastic material which is readily detected by said detecting means.

7. A machine system as set forth in claim 5 in which said pulling means comprises a mechanical linkage system having a friction block for engaging a forward one of said mandrels and its surrounding conduit to thereby fasten the forward conduit covered mandrel to said carriage, and means for moving said carriage and a conduit covered forward mandrel clamped thereto at a speed faster than the speed of the adjoining trailing conduit covered mandrel to provide said controlled axial distance between said connecting means of said adjoining pair of mandrels.

8. A machine system as set forth in claim 7 in which said pulling means comprises an air cylinder for actuating said linkage system to thereby clamp the forward conduit covered mandrel to said carriage, said air cylinder being operated through said control system in response to signals from said detectors.

9. A machine system as set forth in claim 8 in which said pulling means comprises a carriage traversing mechanism.

10. A machine system as set forth in claim 9 in which said carriage traversing mechanism comprises a reversible screw and motor system, said screw and motor system comprising a nut assembly fixed to said carriage, a cooperating screw threadedly engaged in said nut assembly, and a reversible motor for rotating said screw such that with rotation thereof a rectilinear movement is provided to said carriage, said motor being operated in response to signals from said control system.

11. A machine system as set forth in claim 10 in which said nut assembly is an anti-friction nut assembly having recirculating ball bearings.

12. A machine system as set forth in claim 11 in which said motor comprises a reversible electric motor.

13. A machine system as set forth in claim 4 in which said support structure supporting said cutter comprises a table assembly supporting said electric motor and cutter, a pair of cylindrical ways fixed to said carriage in spaced parallel relation perpendicular to said rectilinear path, and a pair of table assembly support structures having a pair of bearing surfaces which engage and are slidably supported on said pair of cylindrical ways.

14. A machine system as set forth in claim 13 in which said actuator for moving said cutter comprises a quick-acting air cylinder which moves said entire table assembly with said cutter and its driving motor supported thereon.

15. A machine system as set forth in claim 14 and further comprising stop means associated with said table assembly for stopping the advancing movement of the table assembly once said cutter has been moved a sufficient distance to cut through said conduit.

16. A machine system as set forth in claim 15 in which said stop means comprises a resilient stop cushion supported at a fixed position on said carriage and a cooperating member fixed to said table assembly.

17. In a method of producing a continuous flexible reinforced elastomeric conduit comprising the steps of; connecting a plurality of elongated rigid mandrels in aligned end-to-end relation with connecting means at opposite ends thereof; continuously forming and supporting said conduit around associated ones of said connected mandrels; moving said conduit and supporting connected mandrels in a rectilinear path; and severing said conduit adjacent each connecting means of each mandrel; the improvement wherein said severing step comprises, providing a carriage for movement along said rectilinear path, said carriage having means supporting the connected mandrels and conduit disposed therearound during movement on said carriage, supporting a cutter on a cutter support structure carried on said carriage for movement therewith along said rectilinear path, said support structure supporting said cutter on said carriage for movement in a cutting path transverse said rectilinear path, disposing detecting means on said carriage for detecting said connecting means, pulling the connecting means of an adjoining pair of mandrels apart over said carriage with pulling means in response to a control signal from said detecting means, said pulling step providing a controlled axial distance between connecting means of said adjoining pair of mandrels, said axial distance being surrounded by a corresponding length of said conduit and having portions of said axial length on opposite sides of said cutting path, and moving said cutter along its support structure and cutting path to cut through said corresponding length of conduit, said severing step serving to cut through conduit at each end of each mandrel so that each mandrel has a length of conduit therearound which is approximately equal to the length of the mandrel.

18. A method as set forth in claim 17 in which said step of providing said carriage for movement along said rectilinear path comprises providing and supporting said carriage on a pair of horizontal ways.

19. A method as set forth in claim 18 in which said step of supporting said cutter comprises supporting a rotary abrasive disc cutter.

20. A method as set forth in claim 18 in which said step of disposing detecting means comprises disposing a pair of cooperating spaced apart magnetic detectors and comprising the further step of connecting a severing apparatus control system in operative association with said detectors, pulling means, and actuator to thereby control the operation of said pulling means and actuator in response to signals from said detectors.

* * * * *